US012646339B2

(12) United States Patent
Toppano et al.

(10) Patent No.: US 12,646,339 B2
(45) Date of Patent: Jun. 2, 2026

(54) METHOD FOR TREATING FOOD IN AN APPLIANCE, FOOD TREATMENT SYSTEM AND SOFTWARE APPLICATION

(71) Applicant: ELECTROLUX APPLIANCES AKTIEBOLAG, Stockholm (SE)

(72) Inventors: Michele Toppano, Porcia (IT); Christoph Luckhardt, Rothenburg ob der Tauber (DE); Vladimir Smirnov, Syktyvkar (RU); Dmitrii Shustrov, Saint-Petersburg (RU); Thorben Schiffler, Rothenburg ob der Tauber (DE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 359 days.

(21) Appl. No.: 18/039,228

(22) PCT Filed: Nov. 23, 2021

(86) PCT No.: PCT/EP2021/082682
§ 371 (c)(1),
(2) Date: May 27, 2023

(87) PCT Pub. No.: WO2022/122375
PCT Pub. Date: Jun. 16, 2022

(65) Prior Publication Data
US 2024/0005681 A1    Jan. 4, 2024

(30) Foreign Application Priority Data
Dec. 7, 2020    (EP) ..................................... 20212214

(51) Int. Cl.
| | |
|---|---|
| *G06V 20/68* | (2022.01) |
| *F24C 7/08* | (2006.01) |
| *H05B 6/64* | (2006.01) |

(52) U.S. Cl.
CPC ................ *G06V 20/68* (2022.01); *F24C 7/08* (2013.01); *H05B 6/6447* (2013.01)

(58) Field of Classification Search
CPC G06Q 10/00; F24C 7/085; F24C 7/08; H05B 6/6447; G06V 20/68
See application file for complete search history.

(56) References Cited

U.S. PATENT DOCUMENTS

| | | | |
|---|---|---|---|
| 2013/0052616 A1* | 2/2013 | Silverstein | ......... G09B 19/0092 434/127 |
| 2018/0292092 A1 | 10/2018 | Bhogal | |

(Continued)

FOREIGN PATENT DOCUMENTS

| | | |
|---|---|---|
| EP | 2662628 | 11/2013 |
| EP | 3608593 | 2/2020 |

OTHER PUBLICATIONS

Khan, Tareq. "An Intelligent Microwave Oven with Thermal Imaging and Temperature Recommendation Using Deep Learning." Applied system innovation (2020): n. pag. Web. (Year: 2020).*

(Continued)

*Primary Examiner* — John R Wallace
(74) *Attorney, Agent, or Firm* — Chrisman Gallo Tochtrop LLC

(57) ABSTRACT

A method for treating food in an appliance (14) by at least one treatment device of the appliance (14) comprises the steps of a. providing a food recognition system with at least one camera image of a food item to be treated by the appliance (14)(S1), b. picture data about the food item by extracting a number of at least one characteristic features of the food item from the at least one camera image (S2), c. assigning a food identification to the food item based on at least one of the number of characteristic features (S4, S6), d. executing a food treatment process or program allocated to the assigned food identification (S8). According to the (Continued)

Figure 1:
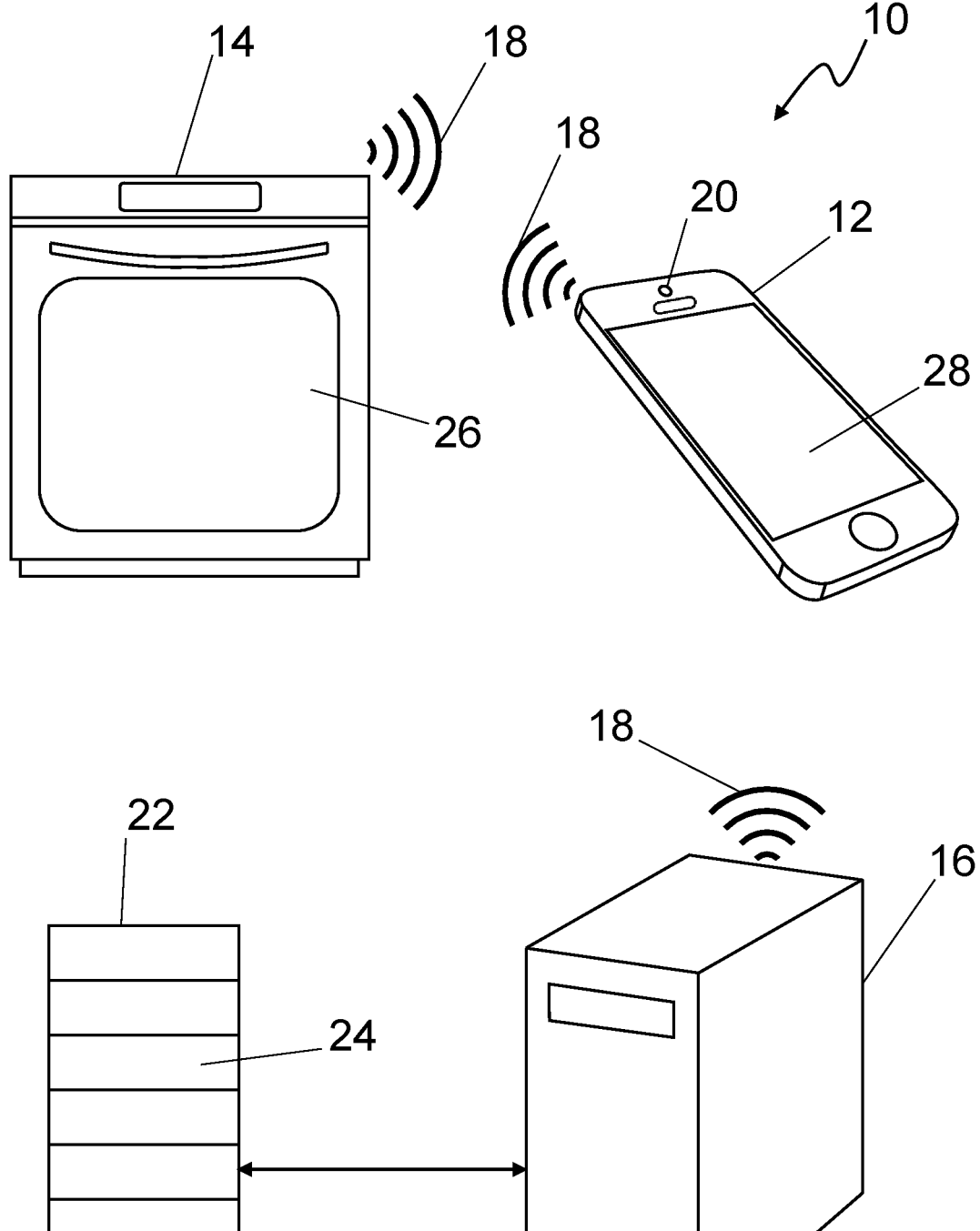

invention, the camera image is provided during step a. (S1) by an external camera device (12, 14), wherein the camera image provision is executed—by data retrieval by the food recognition system, and/or—by data transfer by the mobile camera device (12, 20), and/or—on the operator's initiation. Further disclosed is a food treatment system comprising an appliance (14) for treating food and an external camera device (12, 20) as well as a software application.

19 Claims, 2 Drawing Sheets

(56) References Cited

U.S. PATENT DOCUMENTS

| | | |
|---|---|---|
| 2020/0336326 A1 | 10/2020 | Luckhardt et al. |
| 2021/0089935 A1* | 3/2021 | Jepperson ................ G06N 5/04 |

OTHER PUBLICATIONS

Khan, Tareq. "Smart Microwave Oven with Image Classification and Temperature Recommendation Algorithm." International journal of electrical and computer engineering (Malacca, Malacca) 8.6 (2018): 4239. Web. (Year: 2018).*
International Search Report and Written Opinion for PCT/EP2021/082682, dated Feb. 10, 2022, 11 pages.

* cited by examiner

METHOD FOR TREATING FOOD IN AN APPLIANCE, FOOD TREATMENT SYSTEM AND SOFTWARE APPLICATION

For at least partial automatic food cooking processes, it is known to capture images from a food item to be cooked placed inside a cooking chamber and to evaluate the captured image by extracting characteristic features of the food item in order to identify it. After the identification of the food item an automated cooking process is started based on cooking parameters which have been assigned to the specific food item and stored in a related database.

EP 2 662 628 A1 discloses a method for operating a cooking appliance, in which a food category of a food item automatically can be assigned based on above-mentioned image capture. The operating method includes the steps of capturing an image of a food item placed into the cooking chamber, extracting a set of characteristic features of the food item from the image, assigning a food category to the food item based on the characteristic features and user input, and executing a food processing program assigned to the extracted set of characteristic features and food category. For improving assignment, the method is provided with self-learning performance.

It is an object of the present invention to provide a method for treating food in an appliance, a food treatment system and a software application, which provide more flexibility to a user or operator.

A method for treating food in an appliance by at least one treatment device of the appliance comprises the steps of
    a. providing a food recognition system with at least one camera image of a food item to be treated by the appliance,
    b. picture data about the food item by extracting a number of at least one characteristic features of the food item from the at least one camera image,
    c. assigning a food identification to the food item based on at least one of the number of characteristic features, and
    d. executing a food treatment process or program allocated to the assigned food identification.

According to the present invention, the camera image is provided during step a. by an external camera device. The camera image provision is executed
    by data retrieval by the food recognition system, and/or
    by data transfer by the mobile camera device, and/or
    on the operator's initiation.

The option of a data transfer by the mobile camera device may be designed in that it is performed directly after capturing at least one image.

Particularly, the appliance is an oven appliance, notably a household oven or any kind of cooking appliance, which may be a baking oven, a microwave oven, a cooking hob, or the like. In this respect, the treatment of the food is specifically a heating and, respectively, a cooking thereof and the treatment device is preferably a heating device, particularly a heating element of the oven or cooking appliance.

The food item may be a purchased ready-made meal, e.g. a pre-prepared meal like a frozen pizza or food consigned in air-tight packaging, but specifically the food item is a food item prepared by an operator, e.g. by mixing respective ingredients.

The assignment of a food identification may be or include an assignment of a food category, which means that a number of similar food items may fall under a general heading; e. g. the food category "pizza" comprises all pizza food with any kind of toppings. The expression "similar" shall be understood in this respect in relation to food processing characteristics, which may be associated with similar or identical settings or parameters for the food treatment.

One embodiment of the present invention provides for the method step b. being executed directly after providing the food recognition system with the at least one camera image. Alternatively, this step may depend on any activation by the operator.

The external camera device is preferably a mobile camera device, which further increases the flexibility for the operator. The external camera device may be equipped with sufficient memory for buffering the data related to the captured images. A particularly preferred embodiment of the present invention is characterized by a mobile camera device, which is included in a smart device, particularly in a smartphone or tablet computer.

The food treatment process or program may be executed automatically after the assignment of the food identification to the food item along the lines of specifically allocated settings or parameters for the process or program. However, according to one embodiment, between method step c. and method step d. the method steps
    c1. providing the operator with the food identification for an evaluation, and
    c2. awaiting the operator's selection or confirmation or modification,
are included. The involvement of the operator in the selection of the food identification and/or in the selection of any settings or parameters related to the assigned food is advantageous for an increased safety level, at least with respect to reduce the risk of wrongly treated food items, notably the risk of overheated or even charred food.

The above-mentioned operator's involvement may also result from the situation that some food items are not clearly recognizable and the assignment of a food identification is vague. Some food items may have a similar surface that is mainly captured by the camera image, but ingredients mixture and consistency may be completely different. This may for example apply to a pizza with specific topping and a cherry pie, which have different properties with respect to their baking processes.

Specifically, at least in cases with unclear food recognition, at least two different food identifications may be provided for a selection, preferably for a selection by the operator. Specifically, any provision of a food identification, either if only one or if a plurality of different food identifications are provided for one food item with or after method step c., may be assessed with a recognition probability between 0% and 100%. The assessed recognition probability may assist the operator in making the choice or at least may make aware that the present food item is not unquestionably assignable to any present or known food identification. Also an automated selection may be possible with such provision of recognition probabilities. The food recognition system may for example be provided with an evaluation means, which automatically selects a food identification, for example if a predetermined probability value is reached or exceeded and/or if between the probability of the food identification with the highest value and the probability of a food identification with the second highest value a predefined distance is arrived.

The food treatment process or program according to method step d. may be executed directly or automatically after execution of method step c. or method step c2. Alternatively, the food treatment process or program according to method step d. may be initiated by the operator. It may be provided that the food treatment process or program is started by means of remote operation. In this case, the food treatment process may be prepared e. g. in the morning, particularly by executing method steps a. to c. or a. to c2., and the food treatment process may be finalized e. g. in the afternoon by starting method step d. via a remote operation for finishing a dinner menu.

The food treatment process or program according to method step d. is preferably executed based on the extracted characteristic features, particularly the extracted set of characteristic features. If the operator is provided with the food identification for an evaluation according to method step c1. and may consider any modifications, the food treatment process or program may also be based on such modifications performed by the operator during step c2. Such modification may concern any settings or parameters of the food treatment process or program allocated to the assigned food identification. The operator may also make a re-assignment if it will be identified that the automatic assignment is wrong. In that case, the modification consequently concerns also the related food treatment process or program.

According to an embodiment, the information received during method step b. is compared with related characteristic features stored in datasets of a database. The datasets preferably further include settings or parameters for the food treatment process or program allocated to the present food item. The food recognition system may include the database or the database may be outsourced to any internal or external storage device, specifically outsourced to any server, cloud computing means and/or edge computing systems. In the latter case, the food recognition system preferably comprises communication means and communicates with the database for performing said comparison of the extracted characteristic features with the related characteristic features stored in the datasets of the outsourced database.

If the comparison fails, possibly in the sense of an assignment of a food identification not matching the present food item, which may be expressed by an assignment of a low recognition probability, the present food item may not yet be available in any dataset of the database. To this end, the food recognition system and/or the database is or are capable of being trained in order to increase the number of available datasets. That way, for example a growing cookbook is at hand. The additional and/or new dataset, which comprises or shall comprise the extracted characterizing features linked to the assigned food identification and settings or parameters for the allocated food treatment process or program, may be generated and stored in the database, if at least one of the following situations applies:

i. the extracted characteristic features, particularly the set of characteristic features, are not contained in the database;
  ii. the extracted characteristic features, particularly the set of characteristic features, differ from a dataset stored in the database by a predefined amount; and
  iii. the assigned food identification differs from a predefined or stored food identification linked to the extracted characteristic features, particularly to the set of characteristic features, or a similar dataset.

The dataset or at least the settings or parameters for the allocated food treatment process or program is or are particularly generated based on the operator's determination. If the operator is a member or a beneficiary of an online community, the dataset or the settings or parameters may also be based on or influenced by an input from any other member thereof.

In summary, the method according to the present invention specifically provides for an automatic operation of the appliance for treating food, which is particularly characterized by a self-learning operation. New information from different sources can be stored, provided and used for further optimizing the operation of the appliance for treating food. Moreover, the method as proposed particularly allows building up a pattern recognition and specifically uses an artificial neural network. With such kind of training of a pattern recognition method unknown food items, notably food items not yet comprised in the database, may be recognized and can be implemented in the database, too. Said artificial neural network may be included in or connected to the food treatment system.

A specific embodiment of the method is characterized in that modified settings or parameters are calculated and provided to the operator and/or to a program control of the appliance for treating food, if a deviation of at least one of the extracted characteristic features size, quantity, volume, weight, composition and ingredients from the related characteristic features stored in the dataset for the assigned food identification is recognized in or derived from the at least one camera image.

The advantage of the present invention over the known solutions is an increased flexibility for the operator. Due to the provision of an external camera device, specifically of a mobile camera device, images of the food item may be captured at random places. There is no need to rely on a camera inside or attached at the appliance for treating food. Further, with the present invention, the appliance for treating food can be operated independently from any image capturing. This allows the operator of e.g. a cooking appliance to perform a preheating phase in parallel to capturing images from the food item to be cooked. Further, a sequence of food treatment with the appliance for treating food without any interruption is possible, i. e. during a food treatment process or program operation for a first food item image capturing of a second food item may be performed simultaneously.

According to a specific embodiment of the invention, the at least one camera image is a series of camera images, which may be captured from different distances and/or from different viewpoints. The plurality of camera images, particularly the different views from the food item, increases the recognition capability of the food recognition system.

Compared to the prior art solution with a fixed camera inside of a cooking chamber, the present food recognition system has to treat with an undefined distance of the camera objective to the food item. This may, in the first instance, influence the recognition and extraction of relevant characteristic features like size, height and weight of the food item. In order to address this presumed disadvantage compared to the prior art solutions, the method according to the present invention may be characterized in that variable or indefinite object distances of the food item to the objective of the mobile camera are considered in that a real value of at least one of the characteristic features is calculated by taking into account the related image value derivable from the captured camera image and an assumed object distance. The assumed object distance may be calculated or estimated by an evaluation of the operator's behaviour in usual or earlier image capturing, and/or based on reference points available at the place where the camera images are captured. Said reference points are particularly apparent on a regularly used or standard bearing surface and/or from standard equipment of the appliance for treating food, for example a baking tray of an oven appliance. As an alternative, the operator may be guided in a training process for image capturing or at any time when images of a food item have to be taken.

Naturally, mobile camera devices are subject to a good performance of the operator in image capturing, however, any related problem may be overcome by using a camera device with increased functionality, e. g. with an anti-shake correction function. Moreover, with a particularly high performing camera device also other drawbacks, such as alternating backgrounds and incidence of light, may be compensated. Also the food recognition system may include means, particularly software means, which are capable of compensating such drawbacks.

The object is also achieved by a food treatment system according to the preamble of claim 10 by the characterizing part of claim 10.

A food treatment system comprising an appliance for treating food and a camera is proposed, which food treatment system comprises a food recognition system that is adapted for receiving at least one camera image of a food item to be treated by the appliance, for picture data about the food item by extracting a number of at least one characteristic features of the food item from the at least one camera image, for assigning a food identification to the food item based on at least one of the number of characteristic features, and for executing a food treatment process or program allocated to the assigned food identification.

According to the invention, the camera is an external camera device, which includes data transmission means for providing the food recognition system with the at least one camera image, and the food recognition system comprises data receiving means for receiving at least one camera image from the external camera device. Said data transmission means and data receiving means are configured to perform transmission of the at least one camera image independently from an operational status of the appliance for treating food.

The afore-described food treatment system particularly operates with a method according to anyone of the above-mentioned embodiments or features.

The food item may be a purchased ready-made meal, but specifically the food item is a food item prepared by an operator, e.g. by mixing respective ingredients.

The food treatment system may further comprise a mobile or stationary computer device, in particular a server, cloud computing means and/or edge computing systems, which may provide particular performance in data processing.

A preferred embodiment of the food recognition system according to the present invention provides for a food recognition system, which is included in either the appliance for treating food or the stationary or mobile computer device or the external camera device. Also a fragmentation of the food recognition system may be considered, ending up in at least two portions included in different units, i. e. in at least two of the appliance for treating food, the stationary or mobile computer device and the external camera device. The received camera image is transferred to the food recognition system included in the appliance for treating food or in the stationary or mobile computer device particularly via local area network or a wireless network. If the food recognition system is included in the external camera device, particularly by implementation of both the camera functionality and the food recognition functionality, which may be realized in any smart device, e. g. a smartphone or a tablet computer, the data transmission means and the data receiving means may also be included in the same device.

An advantageous embodiment of the present invention provides for a food treatment system, in which the external camera device and/or the stationary or mobile computer device comprises or comprise output means for a facilitated input of settings or parameters into the appliance for treating food and/or a timer unit automatically triggered or started based on or in parallel to a start of the food treatment process or program, particularly a start by remote control or operation.

The appliance for treating food preferably comprises communication means communicating via a local area network, particularly a wireless local area network. That way, the data transfer to and from the external camera device and/or the stationary or mobile computer device is executable by network connection.

In the case of the appliance for treating food is not equipped with communication means, the data input, notably the input of settings or parameters for the execution of the allocated food treatment process or program has to be performed manually by the operator. Therefore, in order to facilitate such data input, specific output means are included in the external camera device and/or the stationary or mobile computer device. Said output means are particularly voice output means and/or display means, which are preferably configured to display symbols or icons for said facilitated input. Favourably, the icons or symbols represent icons or symbols, e. g. an icon for hot air selection, of input means on a user interface of the appliance for treating food, which may be downloaded from an online user manual and which reduces the time for seeking the respective input means and also reduces the risk of operating errors.

Another specific embodiment of the food treatment system provides for an external camera device and/or stationary or mobile computer device, which is or are connected or connectable to a digital assistant. The connection to the digital assistant may be additionally or alternatively to the connection of the external camera device to the mobile or stationary computing system.

The digital assistant is adapted to operate and/or to act upon the appliance for treating food, in particular to provide a safety switch-off functionality. For example, the digital assistant is one of "Google Home" (trademark, registered by Google LLC with effect for many countries), "ALEXA" (trademark, registered by Amazon Technologies, Inc. with effect for many countries), and "SIRI" (trademark, registered by Apple Inc. with effect for many countries)

or the like.

The object is further achieved by a software application according to claim 15. Said software application is adapted to perform the method and/or to operate or control a food treatment system according to anyone of the above-described embodiments.

Novel and inventive features of the present invention are set forth in the appended claims.

Figure 2:
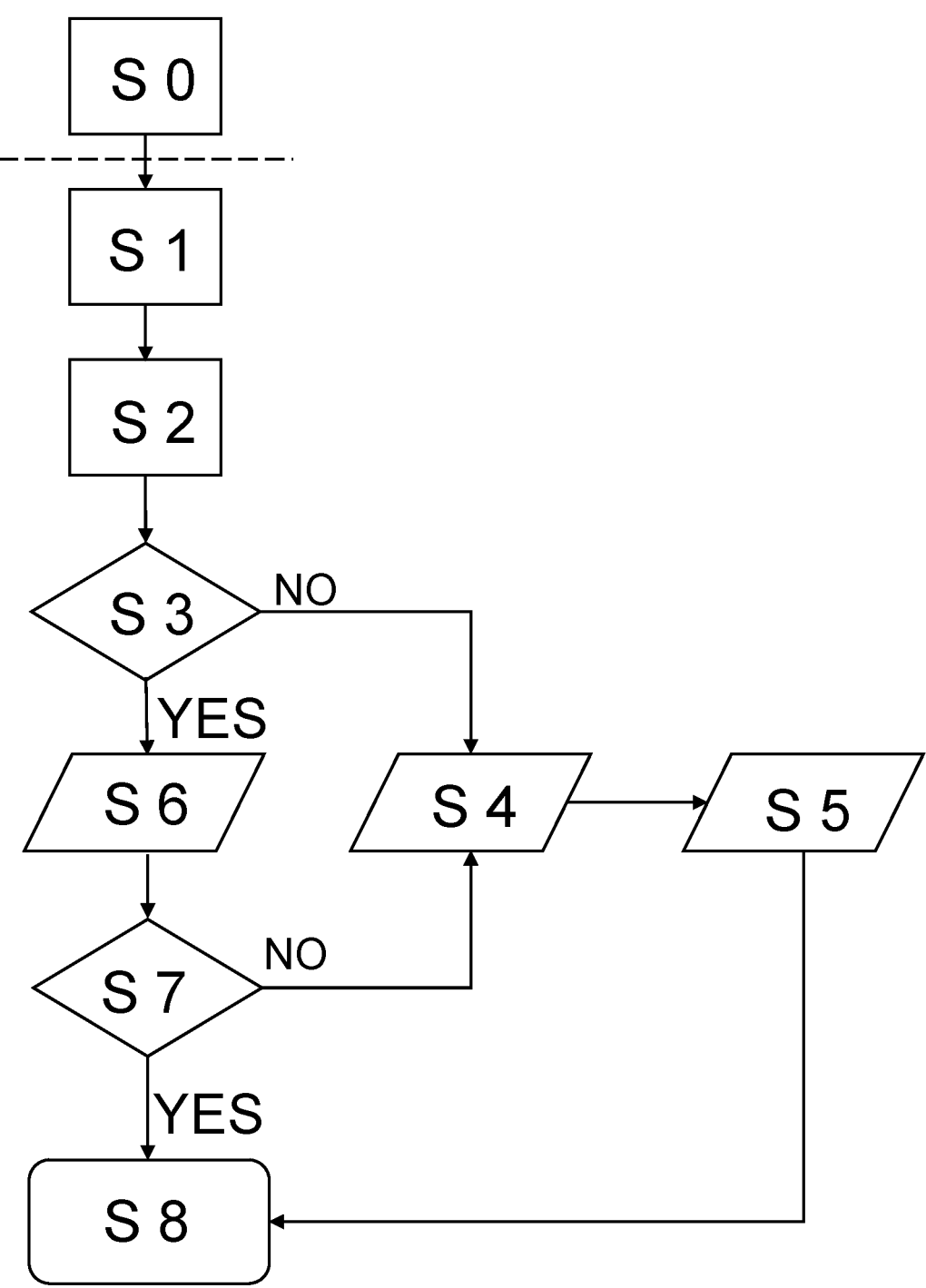

The present invention will be described in further detail with reference to the figures, in which FIG. 1 is a schematic view of a network for exchanging data between a mobile device including a camera, a workstation and an oven; and FIG. 2 is a flowchart illustrating a module of a software application in the mobile device of FIG. 1.

FIG. 1 is a schematic view of a network 10 comprising a mobile device 12, an oven 14, particularly a household oven, and a workstation 16. The components 12, 14, 16 of this network 10 are interconnected, wherein this connection can include wired connections between any components, preferably however, the network is a wireless local area network.

All said components 12, 14, 16 are equipped with communication equipment 18 for wireless communication. The mobile device 12 may be a tablet computer, or the like, but in the present example a smartphone is provided. The mobile device 12 comprises a camera setup including one camera at a front side and one camera at a reverse side. In FIG. 1 only the camera 20 at the front side is illustrated.

The network 10 may be a home network only, or it may have connection to the Internet. In the latter case, a long distance communication, particularly a remote control operation, is enabled.

The workstation 16 is connected to a database 22 including a plurality of datasets 24 comprising data, in particular settings and/or parameters, related to cooking processes or programs for cooking different kinds of food. The database 22 may also include recipe information.

The oven 14 is configured for performing cooking processes on food to be inserted into an oven chamber 26, in which any kind of cooking processes, like baking, grilling or roasting, can be executed. However, not only a household oven 14 as in the present example may be included in the network 10, in fact, the oven 14 can include or be extended to e. g. a cooking hob, a microwave oven, or the like.

The network 10 and the included components 12, 14, 16, 22 provide a cooking system for cooking food, which is configured for an automated cooking process. To this end, a food recognition system is included, according to which a food item that is intended to be cooked is identified and, after identification of the present food item, a cooking process is executed, particularly started by automated operation.

The food recognition system includes the camera 20 of the mobile device 12 for capturing images from the food item to be cooked, an extraction module for extracting characteristic features of the food item from the captured images, a comparing module for comparing the extracted characteristic features with deposited characteristic features stored in datasets 24 of the database 22, and an assignment module for assigning a deposited food identification to the food item to be cooked, wherein the deposited food identification is assigned to and stored in the same dataset 24 as the deposited characteristic features.

FIG. 2 illustrates a flowchart for a program module of a software application in the mobile device 12 controlling the automated cooking process. The different stages of the flowchart are designated by reference signs S1 to S8 and described as follows.

In the first step S0, which is a manually performed step and therefore not included in the flowchart for the software application, the operator creates a raw product of the food item to be cooked, e. g. a pizza dough layer covered with pizza topping. The uncooked pizza is got ready on a baking tray for being baked in the cooking chamber 26. Before inserting the uncooked pizza into the chamber 26, the operator requires settings and parameters for the related baking process. Instead of looking up in a cookbook, which may be specifically cumbersome in cases where the related title of the food item is not exactly known, and instead of a manual input of the respective settings and parameters into a user interface of the oven 14, the operator decides to start an automated cooking process using image data from the food item, in the present example from the uncooked pizza. To this end, the operator captures images, e. g. from above and in a perspective orientation, using the camera 20 of the mobile device 12.

With step S1, the captured images are transmitted over the network 10 to the workstation 16 using the communication equipment 18. The workstation 16 is characterized by high computing power capable of processing high data volume. In general, where a similar computing power may be available in the mobile device 12, the data processing may be performed completely in the mobile device 12 only, so that the workstation 16 would not be needed.

Workstation 16 includes an extraction module configured to extract characteristic features of the food item from the captured images for the identification of the present food item. To this end, a pattern recognition method using an artificial neural network is at hand. The extraction of characteristic features is executed during step S2.

In a third step S3 the extracted features are compared with related deposited features stored in datasets 24 of database 22 in order to find out if an identical or similar dataset already exists that has been already assigned to the food identification.

If no dataset 24 with identical or similar characteristic features or only datasets 24 with merely low matching rate will be found in the database 22, the method will proceed with step S4. In this step S4, the operator will be asked by means of a query on a display 28 of the mobile device 12, to identify and/or to select, in particular to input, a food identification applying to the food item to be cooked.

After assignment of an appropriate food identification by the operator, the extracted set of characteristic features together with the assigned food identification is stored in a new dataset 24 of the database 22, see step S5. At this step S5, the method is continued with step S8, in which a program cooking the food item, in the present example the pizza, is executed, i. e. the food item is baked respectively. The executed cooking program is automatically selected or assigned using the data in the related dataset 24, wherein in the case of a new dataset 24 with a newly implemented food identification the respective program settings or parameters may be included by an operator input.

If the database 22 comprises a dataset 24 with a high matching rate of characteristic features with related deposited features, a food identification is proposed in step S6 based on the dataset 24 available in the database 22.

In step S7, a query to the operator is displayed on display 28 whether or not the food identification identified or assigned in step S6 fits the present food item. If the assigned or identified food identification is found not to fit the food item, the method will proceed with step S4.

If, on the other hand, the assigned or identified food identification is found to be appropriate, i. e. when the operator accepts the proposed food identification, the method proceeds with step S8.

It has to be noted that the above-described example for a method for cooking food in the oven 14 is generally applicable, i. e. the method is applicable both in the case of an oven 14 included in a network 10, as described, or in the case of an oven that does not comprise a communication equipment 18. In the latter case, however, the operator has to take over the task of providing the oven with the settings and parameters which are identified to fit the present food item, wherein the settings or parameters may then be provided to the operator on the display 28.

For both cases the following use cases are proposed:

Use Case 1A: Assuming that a Prepared Dish can be Recognized And the Operator has a Connected Oven 14

The operator prepares a dish, which shall be cooked. The operator takes an image of the prepared dish with the camera 20 of the mobile device 12. The image is processed by a food recognition system. The prepared dish is recognized by the food recognition system and corresponding settings are proposed to the operator. The operator can adjust the settings proposed for that dish and send the settings to the connected oven 14 in order to start it remotely and initiate the cooking process.

Use Case 1B: Assuming that a Prepared Dish Cannot be Recognized And the Operator has a Connected Oven 14

The operator prepares a dish, which shall be cooked. The operator takes an image of the prepared dish with the camera 20 of the mobile device 12. The image is processed by a food recognition system. The prepared dish is not recognized by the food recognition system. The operator can add the dish to the food recognition system and train it with the image that has been taken, assign settings for the dish and name it. Next time preparing the same dish, the food recognition system will recognize the dish due to the training and proposes corresponding settings that have been assigned by the operator. The user can adjust the settings proposed for that dish and send the settings to the connected oven in order to start it remotely and initiate the cooking process.

Use Case 2A: Assuming that a Prepared Dish can be Recognized And the Operator has a Non-Connected Oven The operator prepares a dish, which shall be cooked. The operator takes an image of the prepared dish with the camera 20 of the mobile device 12. The image is processed by a food recognition system. The prepared dish is recognized by the food recognition system and corresponding settings are proposed to the operator. The operator can adjust the settings proposed for that dish. Since the operator does not have a connected oven, the settings have to be input manually at the oven to start the cooking process. In order to facilitate the manual input, not only the respective settings and parameters are illustrated on the display 28, but also icons are provided illustrating the input means on the user interface of the oven, which have to be operated during the manual input.

Use Case 2B: Assuming that a Prepared Dish Cannot be Recognized And the Operator has a Non-Connected Oven The operator prepares a dish, which shall be cooked. The operator takes an image of the prepared dish with the camera 20 of the mobile device 12. The image is processed by a food recognition system. The prepared dish is not recognized by the food recognition system. The operator can add the dish to the food recognition system and train it with the image that has been taken, assign settings for the dish and name it. Next time preparing the same dish, the food recognition system will recognize the dish due to the training and proposes corresponding settings that have been assigned by the operator. The operator can adjust the settings proposed for that dish. Since the operator does not have a connected oven, the settings have to be input manually at the oven to start the cooking process. In order to facilitate the manual input, not only the respective settings and parameters are illustrated on the display 28, but also icons are provided illustrating the input means on the user interface of the oven, which have to be operated during the manual input.

Although an illustrative embodiment of the present invention has been described herein with reference to the accompanying figures, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 network
12 mobile device

10

14 oven
16 workstation
18 communication equipment
20 camera
22 database
24 dataset
26 cooking chamber
28 display

The invention claimed is:

1. A method for treating food in an appliance, comprising the steps of:
   a. receiving at least one camera image at a food recognition system, the at least one camera image comprising an image of a food item to be treated by the appliance,
   b. extracting at least one characteristic feature of the food item from the at least one camera image,
   c. based on the at least one characteristic feature extracted from the at least one camera image, performing either one of the following steps:
      c.1. providing a proposed food identification and querying an operator to confirm the proposed food identification or provide a modified food identification, or
      c.2. querying the operator to provide a manually assigned food identification,
   d. executing a food treatment process or program allocated to the proposed food identification, the modified food identification, or the manually assigned food identification,
   wherein the camera image is received at the food recognition system via:
      data retrieval by the food recognition system, and/or
      data transfer by an external camera device directly after capturing the at least one camera image, and/or
      an operator's initiation,
   wherein variable or indefinite object distances of the food item to an objective of the external camera are considered by calculating a real value of the at least one characteristic feature with taking into account a related image value derivable from the camera image and an assumed object distance, wherein the assumed object distance is calculated or estimated:
      by an evaluation of the operator's behavior in usual or earlier image capturing, and/or
      based on reference points apparent on a regularly used or standard bearing surface and/or from standard equipment.

2. The method according to claim 1, wherein the method comprises performing step c.2., and executing the food treatment process or program allocated to the proposed food identification or the modified food identification.

3. The method according to claim 1, wherein:
   the food treatment process or program according to step d. is executed directly after execution of step c., or
   the food treatment process or program according to step d. is initiated by the operator.

4. The method according to claim 1, wherein the at least one characteristic feature extracted during step b. is compared with related characteristic features stored in datasets of a database, the datasets further including settings or parameters for the food treatment process or program.

5. The method according to claim 4, wherein an additional and/or new dataset
   is generated and stored in the database if at least one of the following situations applies:

i. the at least one characteristic feature is not contained in the database;

ii. the at least one characteristic feature differs from a dataset already stored in the database by a predefined amount; and iii. the manually assigned food identification differs from a predefined or stored food identification linked to the at least one characteristic feature, or a similar already-stored dataset in the database, wherein the additional and/or new dataset comprises the at least one characteristic feature and settings or parameters for the food treatment process or program, and wherein the additional and/or new dataset or at least the settings or parameters for the food treatment process or program is or are generated based on the operator's determination or based on an input from a member of an online community.

6. The method according to claim 4, wherein the at least one characteristic feature comprises at least one of the following features:

size,
quantity,
volume,
weight,
composition, and
ingredients wherein if a deviation of the at least one characteristic feature from related characteristic features stored in the dataset for the assigned food identification is recognized in or derived from the at least one camera image, modified settings or parameters are calculated and provided to the operator and/or to a program control of the appliance for treating food.

7. The method according to claim 1, wherein the at least one camera image is a series of camera images captured from different distances and/or from different viewpoints.

8. A non-transitory computer memory storage device comprising machine-readable instructions that, when executed by a processer of a food-treatment appliance will cause the appliance to execute the method according to claim 1.

9. The method according to claim 1, wherein food treatment process or program is automatically selected by the appliance, or by the external camera or a workstation and then communicated to the appliance via a network, the method further comprising the appliance cooking the food item using settings associated with the food treatment process or program.

10. A food treatment system comprising a food recognition system adapted for:

receiving from an external camera device via a wireless data transmission at least one camera image of a food item to be treated by the appliance, extracting at least one characteristic feature of the food item from the at least one camera image, based on the at least one characteristic feature, performing either one of the following steps:

providing a proposed food identification and querying an operator to confirm the proposed food identification or provide a modified food identification, or querying the operator to provide a manually assigned food identification, and executing a food treatment process or program allocated to the proposed food identification, the modified food identification, or the manually assigned food identification, wherein the food treatment system is configured to receive the at least one camera image via said wireless data transmission independently from an operational status of the appliance for treating food, wherein variable or indefinite object distances of the food item to an objective of the external camera device are considered by calculating a real value of the at least one characteristic feature with taking into account a related image value derivable from the at least one camera image and an assumed object distance, wherein the assumed object distance is calculated or estimated:

by an evaluation of the operator's behavior in usual or earlier image capturing, and/or based on reference points apparent on a regularly used or standard bearing surface and/or from standard equipment.

11. The food treatment system according to claim 10, further comprising a mobile or stationary computer device providing particular performance in data processing.

12. The food treatment system according to claim 11, wherein the food recognition system is included in any one of:

the appliance for treating food, the stationary or mobile computer device, and the external camera device, wherein the received at least one camera image is transferred to the food recognition system included in the appliance for treating food or in the stationary or mobile computer device via a local area network.

13. The food treatment system according to claim 11, wherein the external camera device and/or the stationary or mobile computer device comprises or comprise:

voice output means and/or icon display means for a facilitated input of settings or parameters into the appliance for treating food, the icon display means displaying icons representing input means on a user interface of the appliance for treating food, and/or a timer unit automatically triggered or started based on or in parallel to a start of the food treatment process or program.

14. The food treatment system according to claim 11, wherein the external camera device and/or the stationary or mobile computer device is connected or connectable to a digital assistant, which is adapted to operate and/or to act upon the appliance for treating food to provide a safety switch-off functionality.

15. A method for treating food in an appliance, comprising:

a. receiving first and second camera images of a subject food item captured by an external camera device from different perspectives relative to the subject food item;

b. extracting from the first and second camera images at least one characteristic feature of the subject food item via pattern recognition using an artificial neural network;

c. comparing the at least one characteristic feature with known food-item features that are grouped together into a plurality of existing datasets that correspond, respectively, to known food items and are stored in a database;

d. based on step c., performing either one of the following steps:

d.1. if one or more identified food-item features of the known food-item features have at least threshold similarity to the at least one characteristic feature, providing a proposed food identification associated with the one or more identified known food-item features, and querying an operator to confirm the proposed food identification or provide a modified food identification; or d.2. if none of the known food-item features has at least the threshold similarity to the at least one characteristic feature, querying the operator via a display on the external camera device to provide a manually assigned food identification that corresponds to the subject food item, and then storing the at least one characteristic feature together with the manually assigned food identification in a new dataset in the database corresponding to the subject food item; and e. automatically selecting a suitable cooking program to cook the subject food item based on the proposed food identification or manually assigned food identification, wherein variable or indefinite object distances of the food item to an objective of the external camera device are considered by calculating a real value of the at least one characteristic feature with taking into account a related image value derivable from the camera image and an assumed object distance, wherein the assumed object distance is calculated or estimated:

by an evaluation of the operator's behavior in usual or earlier image capturing, and/or based on reference points apparent on a regularly used or standard bearing surface and/or from standard equipment.

16. The method according to claim 15, wherein the method includes performing step d.2., which further comprises prompting the operator to manually enter cooking parameters suitable for cooking the subject food item, wherein the manually entered cooking parameters are saved in the new dataset for use in cooking a subsequent food item.

17. The method according to claim 15, wherein the method includes performing step d.1., which includes querying the operator to confirm proposed food identification, and if the operator responds that the proposed food identification is inappropriate then the step d. 1. further includes querying the operator via the display on the external camera device to provide the manually assigned food identification.

18. The method according to claim 15, said suitable cooking program being automatically selected by the external camera device or by a workstation connected therewith via a network, wherein settings associated with the suitable cooking program are displayed on the external camera device to enable the operator to enter those settings manually on a cooking appliance that is not connected to the network.

19. The method according to claim 15, said suitable cooking program being automatically selected by a cooking appliance connected to the network, or by the external camera or a workstation and then communicated to the cooking appliance via said network, the method further comprising the cooking appliance cooking the subject food using settings associated with the suitable cooking program.

* * * * *